United States Patent
Christopoulos et al.

(10) Patent No.: US 7,388,913 B1
(45) Date of Patent: Jun. 17, 2008

(54) DOWN SCALING OF IMAGES

(75) Inventors: Charilaos Christopoulos, Sollentuna (SE); Athanasios Skodras, Patras (GR)

(73) Assignee: Telefonaktiebolaget LM Ericsson (pub), Stockholm (SE)

( * ) Notice: Subject to any disclaimer, the term of this patent is extended or adjusted under 35 U.S.C. 154(b) by 1468 days.

(21) Appl. No.: 09/394,428

(22) Filed: Sep. 13, 1999

Related U.S. Application Data

(63) Continuation of application No. PCT/SE98/00448, filed on Mar. 12, 1998.

(30) Foreign Application Priority Data

Mar. 14, 1997 (SE) .................... 9700926
Oct. 22, 1997 (SE) .................... 9703849

(51) Int. Cl.
*H04N 7/12* (2006.01)

(52) U.S. Cl. ................................. 375/240.16

(58) Field of Classification Search ............ 348/14.12, 348/408.1, 398.1, 508.1, 575, 411, 390.1, 348/439.1, 571, 405.1, 390, 446, 400, 401, 348/402, 403, 405, 409, 410, 412, 413; 375/240, 375/240.18, 240.2, 240.16, 240.28, 240.12, 375/240.24; 358/426, 432, 433; 382/248, 382/245, 232, 251, 250, 100, 233, 239, 246
See application file for complete search history.

(56) References Cited

U.S. PATENT DOCUMENTS 4,293,920 A * 10/1981 Merola ........................ 364/725
5,107,345 A * 4/1992 Lee ............................ 358/432
5,293,434 A * 3/1994 Feig et al. ..................... 382/56
5,363,096 A 11/1994 Duhamel et al.
5,452,104 A 9/1995 Lee
5,485,279 A * 1/1996 Yonemitsu et al. ......... 348/411
5,528,533 A 6/1996 Kitaura et al.
5,537,440 A * 7/1996 Eyuboglu et al. ........... 375/245
5,541,852 A * 7/1996 Eyuboglu et al. ........... 709/232
5,854,858 A * 12/1998 Girod et al. ................ 382/250
5,870,146 A * 2/1999 Zhu ....................... 375/240.03
6,192,081 B1 * 2/2001 Chiang et al. ......... 375/240.16

FOREIGN PATENT DOCUMENTS

| JP | 02-200082 | 8/1990 |
| WO | 92/22137 | 12/1992 |
| WO | 98/19460 | 5/1998 |

OTHER PUBLICATIONS

*IEEE Transactions on Signal Processing*, vol. 41, No. 1, Jan. 1993, pp. 480-485, N. Rama Murthy et al., "On a Novel Decomposition of the DCT and its Application".
*Digital Image Processing Volume*, 1987 (Addison-Wesley Publishing Company), Reading, Mass et al., R.C. Gonzales et al., pp. 100-105; pp. 121-122.
English translation of Official Action mailed Jan. 9, 2007, in corresponding Japanese patent application No. 540418/98.

* cited by examiner

*Primary Examiner*—Tung Vo
*Assistant Examiner*—Behrooz Senfi
(74) *Attorney, Agent, or Firm*—Nixon & Vanderhye P.C.

(57) ABSTRACT

A Discrete Cosine Transform (DCT) for an entire original sequence is obtained using the DCT coefficients representing the first half and the second half of the original sequence. This is useful when calculation of DCTs of a certain length is supported by hardware and/or software and different size DCTs must be calculated. Example areas of application include still image and video transcoding and scalable image and/or video coding.

12 Claims, 4 Drawing Sheets

DOWN SCALING OF IMAGES

This is a continuation of PCT application No. PCT/SE98/00448, filed 12 Mar. 1998, the entire content of which is hereby incorporated by reference in this application.

TECHNICAL FIELD

The present invention relates to a method and a device for computing the Discrete Cosine Transform (DCT) for image and video transcoding and scalable video coding.

BACKGROUND OF THE INVENTION AND PRIOR ART

It is reasonable to expect that in the future a wide range of quality video services like High Definition TV (HDTV) will be available together with Standard Definition TV (SDTV), and video services of lower quality such as videophone and videoconference. Multimedia documents containing video will most probably not only be retrieved over computer networks, but also over telephone lines, Integrated Services Digital Network (ISDN), Asynchronous Transfer Mode (ATM), or even mobile networks.

The transmission over several types of links or networks with different bit rates and varying traffic load will require an adaptation of the bit rate to the available channel capacity. The main constraint of the systems is that the decoding of any level below the one associated with the transmitted format should not need the complete decoding of the transmitted source.

In order to maximise the integration of these various quality video services, a single coding scheme which can provide an unlimited range of video services is desirable. Such a coding scheme would enable users of different qualities to communicate with each other. For example, a subscriber to only a lower quality video service should be capable of decoding and reconstructing a digitally transmitted higher quality video signal, albeit at the lower quality service level to which he subscribes. Similarly, a higher quality service subscriber should be capable of decoding and reconstructing a digitally transmitted lower quality video signal although, of course, its subjective quality will be no better than that of the transmitted quality.

The problem therefore is associated with the way in which video will be transmitted to subscribers with different requirements (picture quality, processing power, memory requirements, resolution, bandwidth, frame rate, etc.). The following points summarise the requirements:

satisfy users having different bandwidth requirements, satisfy users having different computational power, adapt frame rate, resolution and compression ratio to user preferences and available bandwidth, adapt frame rate, resolution and compression ratio to network abilities, short delay, and conform with standards, if required.

One solution to the problem of satisfying the different requirements of the receivers is the design of scalable bitstreams. In this form of scalability, there is usually no direct interaction between a transmitter and a receiver. Usually, the transmitter is able to make a bit stream which consists of various layers which can be used by receivers with different requirements in resolution, bandwidth, frame rate, memory or computational complexity. If new receivers are added which do not have the same requirements as the existing ones, then the transmitter has to be re-programmed to accommodate the requirements of the new receivers. Briefly, in bit stream scalability, the abilities of the decoders must be known in advance.

A different solution to the problem is the use of transcoders. A transcoder accepts a received data stream encoded according to a first coding scheme and outputs an encoded data stream encoded according to a second coding scheme. If one had a decoder which operates according to a second coding scheme then such a transcoder would allow reception of the transmitted signal encoded according to the first coding scheme without modifying the original encoder.

One situation that usually appears especially in multiparty conferences is that a particular receiver has a different bandwidth ability and/or a different computational requirements. For example, in a multipoint communication with participants connected through ISDN and Public Switched Telephone Network (PSTN), the bandwidth can vary from 28.8 kbits/s (PSTN) to more than 128 kbits/s (ISDN). Since video transmitted at as high bit rates as 128 kbits/s can not be transferred over PSTN lines, video transcoding has to be implemented in the Multipoint Control Unit (MCU) or Gateway.

This transcoding might have to implement a spatial resolution reduction of the video in order to fit into the bandwidth of a particular receiver. For example, an ISDN subscriber might be transmitting video in Common Intermediate Format (CIF) (288=352 pixels), while a PSTN subscriber might be able to receive video only in a Quad Common Intermediate Format (QCIF) (144×176). Another example is when a particular receiver does not have the computational power to decode at a particular resolution and therefore a reduced resolution video has to be transmitted to that receiver. Additionally, transcoding of HDTV to SDTV requires a resolution reduction.

For example, the transcoder could be used to convert a 128 kbit/s video signal in CIF format conforming to ITU-T standard H.261, from an ISDN video terminal for transmission to a 28.8 Kbit/s video signal in QCIF format over a telephone line using ITU-T standard H.263.

It should also be noted that many scalable video coding systems require both the use of 8×8 and 4×4 DCT. For example, in L. H. Kieu and K. N. Ngan, "Cell-loss concealment techniques for layered video codecs in an ATM network", *IEEE Trans. On Image Processing*, Vol. 3, No. 5, pp. 666-677, September 1994, a scalable video coding system is described in which the base layer has lower resolution compared to the enhancement layer. In that system, an 8×8 DCT is applied in each of the 8×8 blocks of the image and the enhancement layer is compressed using the 8×8 DCT. The base layer uses the 4×4 out of the 8×8 DCTs of each block of the enhancement layer and is compressed using only 4×4 DCTs. This however is not beneficial since a 4×4 DCT usually results in reduced performance compared to the 8×8 DCT and it requires also that encoders and decoders have to be able to handle 4×4 DCTs/IDCTs.

The traditional method of downsampling an image consists of two steps, see J. Bao, H. Sun, T. C. Poon, "HDTV down conversion decoder", *IEEE Trans. On Consumer Electronics*, Vol. 42, No. 3, pp. 402-410, August 1996. First the image is filtered by an anti-aliasing low pass filter. The filtered image is downsampled by a desired factor in each dimension. For a DCT-based compressed image, the above method implies that the compressed image has to be recovered to the spatial domain by inverse DCT and then undergo the procedure of filtering and downsampling. If the image is to be compressed and transmitted again, this requires an extra forward DCT after the undersampling stage. This can be the case in which the undersampling takes place in a Multipoint Control Unit—MCU in order to satisfy the requirements and bandwidth of a particular receiver, or in scalable video coding schemes.

In a different method, that works in the compressed domain, both the operations of filtering and downsampling are combined in the DCT domain. This is done by cutting DCT coefficients of high frequencies and using the inverse DCT with a lower number of DCT coefficients in order to reconstruct the reduced resolution image. For example, one can use the 4×4 out of the 8×8 and perform the IDCT of these coefficients in order to reduce the resolution by a factor of 2 in each dimension. This does not result in significant compression gains and additionally requires that receivers are able to handle 4×4 DCTs.

Furthermore, this method results in significant amount of block edge effects and distortions, due to the poor approximations introduced by simply discarding higher order coefficients. The above method would be more useful if one had 16×16 DCT blocks and were keeping the low frequency 8×8 DCT coefficients in order to obtain the downsampled image. However, most image and video compression standard methods like JPEG, H.261, MPEG1, MPEG2 and H.263 segment the images into rectangular blocks of size 8×8 pixels and apply the DCT onto these blocks. Therefore, only 8×8 DCTs are available. A way to compute the 16×16 DCT coefficients is to apply inverse DCT on each of the 8×8 blocks and reconstruct the image. Then the DCT on blocks of size 16×16 can be applied and the 8×8 out of the 16×16 DCTs coefficients of each block can be kept, if a resolution reduction by a factor of 2 in each dimension is required.

This, however, requires complete decoding (perform 8×8 IDCTs) and re-transforming by performing 16×16 DCTs (16×16 DCT hardware would be required). However, if one could compute the 8×8 out of the 16×16 DCT coefficients by using only 8×8 transformations, then this method would be faster and also would perform better than the one that uses the 4×4 out of the 8×8. It would also mean that computation of DCTs of size 16×16 is avoided and reduced memory requirements are obtained. Furthermore, U.S. Pat. No. 5,107,345 describes an adaptive DCT scheme used in coding. The scheme uses 2×2, 4×4, 8×8 and 16×16 DCTs in order to obtain a flexible bit rate which can be modified according to the available transmission capacity. Our scheme provides a fast computation to this adaptive scheme.

SUMMARY

It is an object of the present invention to provide a method and a device which overcomes the problems associated with the use of DCT of different sizes as outlined above. This object and others are obtained by a method and a devices for the computation of an N-point DCT using only transforms of size N/2 as set out in the claims. The present invention also provides a direct computational algorithm for obtaining the DCT coefficients of a signal block taken from two adjacent blocks, i.e. it can be used for directly obtaining the N point DCT of an original sequence from 2 N/2 DCTs, which represent the DCT coefficients of the first N/2 data points of the original sequence and the last N/2 data points of the original sequence, respectively.

Furthermore, a method that can be used for decreasing the spatial resolution of the incoming video is also obtained. The method provides lower spatial resolution reconstructed video with good picture quality, less complexity and memory requirements. It can be applied to image and/or video transcoding from a certain resolution factor to a lower one, while in the compressed domain. It can also be applied in scalable video coding and in adaptive video coding schemes. The main advantage of the scheme is that it requires DCT algorithms of standard size (8×8 in the case of the existing video standards) and results in better performance compared to existing schemes.

BRIEF DESCRIPTION OF THE DRAWINGS

The present invention will now be described by way of non-limiting examples and with reference to the accompanying drawings, in which.

DESCRIPTION OF PREFERRED EMBODIMENTS

Figure 1:
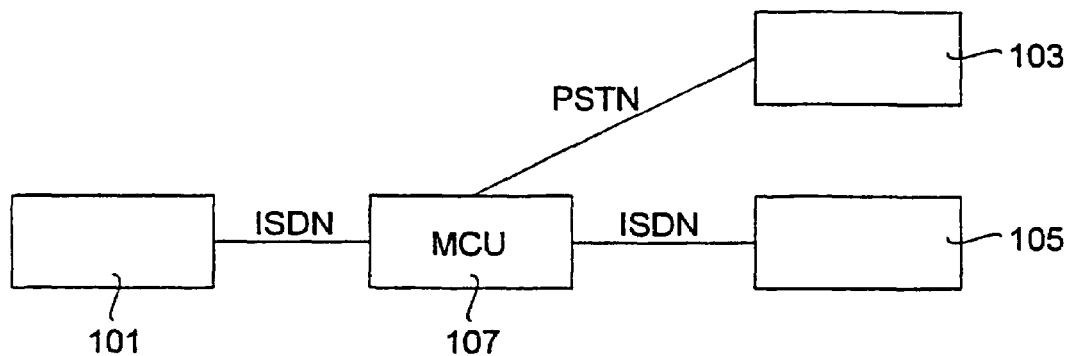
FIG. 1 is a diagram illustrating a multipoint communication system.

In FIG. 1, a transmission system for digitised images is shown. Thus, in this example three users 101, 103 and 105 are connected to each other via an MCU 107. The users in this case have different capabilities. Users 101 and 105 are connected via 128 kbit/s ISDN connections, while user 103 is connected via a 28.8 kbit/s PSTN connection. In a point-to-point communication, users 101 and 103 can also be connected through a gateway.

In such a case, users 101 and 105 may transmit video signals in a CIF format to each other. However, if user 103 wants to receive the video signal transmitted between the users 101 and 105, he/she is unable to do so, due to the limited transmission capacity of his/her transmission line, unless some kind of bit reduction is performed in the MCU.

One way of obtaining this bit reduction at the MCU is to extract the 4×4 low frequency coefficients of the 8×8 DCT coefficients of the incoming video from users 101 and 105 and to transmit only these to user 103 in order to reconstruct the incoming frames in QCIF format through appropriate scaling of the motion vectors. This will not be beneficial from a compression and quality point of view. Instead, it would be more beneficial if low frequency 8×8 DCT coefficients were extracted out of 16×16 blocks of DCT coefficients. This can then be performed in the following manner without having to use DCTs/IDCTs other than 8×8 points.

Let the DCT coefficients of 4 adjacent 8×8 blocks of the CIF image be stored in 2D arrays in the form $$Z = \begin{bmatrix} \Phi_1 & \Phi_2 \\ \Phi_3 & \Phi_4 \end{bmatrix} \text{ where } \Phi_i \, (i = 1, 2, 3, 4) \text{ are } \left(\frac{N}{2} \times \frac{N}{2}\right) -$$

point arrays (of DCT coefficients), where N=16 in the following examples. Each row of k of Z consists of row k of block $\Phi_i$ and of row k of block $\Phi_j$ (i=1 and j=2 or i=3 and j=4). For each row k of Z, the problem now is to calculate the N point DCT when having the N/2 DCT points of $\Phi_i$ and $\Phi_j$ (i=1 and j=2 or i=3 and j=4).

In order to solve the problem of calculating the N point DCT from two N/2 DCT sequences, the following method can be used. Suppose that the sequence $x_i$, i=0,1, ..., N−1 is present. Then consider the following sequences: $y_i=x_i$, i=0,1, ..., (N/2)−1, and $z_i=x_{i+N/2}$, i=0,1, ..., (N/2)−1. Also assume that N=$2^m$, and assume that hardware for the computation of the N/2-point DCT/IDCT is available in the MCU 107. In this specific case N=16, which today is the normal case for computing DCT/IDCT since N/2=8, and 8×8 DCTs are mainly used in standard video coding schemes.

The problem is to compute the DCT coefficients of $x_i$ by having the DCT coefficients of $y_i$ and $z_i$. For downsampling by a factor of 2, in this case half of the DCT coefficients of $x_i$ (the low frequency coefficients) are needed.

First some necessary definitions are given. The normalised DCT (DCT-II) of $x_i$ is given by the equation, see K. R. Rao and P. Yip, *Discrete Cosine Transform: Algorithms, Advantages and Applications,* Academic Press Inc., 1990:

$$X_k = \sqrt{\frac{2}{N}} \varepsilon_k \sum_{i=0}^{N-1} x_i \cos\frac{(2i+1)k\pi}{2N}, k = 0, 1, \ldots, N-1 \quad (1)$$

and the inverse DCT (IDCT) is given by the equation:

$$x_i = \sqrt{\frac{2}{N}} \sum_{k=0}^{N-1} \varepsilon_k X_k \cos\frac{(2i+1)k\pi}{2N}, i = 0, 1, \ldots, N-1 \quad (2)$$

where $$\varepsilon_k = \begin{cases} \frac{1}{\sqrt{2}} & \text{for } k = 0 \\ 1 & \text{for } k \neq 0 \end{cases} \quad (3)$$

Notice that $\varepsilon_{2k} = \varepsilon_k$ and $\varepsilon_{2k+1} = 1$.

The normalised DCT-IV of $x_i$ is given by the equation, see the above cited book by K. R. Rao et al.

$$X_k = \sqrt{\frac{2}{N}} \sum_{i=0}^{N-1} x_i \cos\frac{(2i+1)(2k+1)\pi}{4N}, k = 0, 1, \ldots, N-1 \quad (4)$$

and the inverse DCT-IV (IDCT-IV) is given by:

$$x_i = \sqrt{\frac{2}{N}} \sum_{k=0}^{N-1} X_k \cos\frac{(2k+1)(2i+1)\pi}{4N}, i = 0, 1, \ldots, N-1 \quad (5)$$

Notice that the DCT-IV and the IDCT-IV are given by the same equation.

The normalised DST-IV of $x_i$ is given by the equation, see the above cited book by K. R. Rao et al.

$$X_k = \sqrt{\frac{2}{N}} \sum_{i=0}^{N-1} x_i \sin\frac{(2i+1)(2k+1)\pi}{4N}, k = 0, 1, \ldots, N-1 \quad (6)$$

and the inverse DST-IV (IDST-IV) is given by:

$$x_i = \sqrt{\frac{2}{N}} \sum_{k=0}^{N-1} X_k \sin\frac{(2k+1)(2i+1)\pi}{4N}, i = 0, 1, \ldots, N-1 \quad (7)$$

Notice that the DST-IV and the IDST-IV are given by the same equation.

It should be noted that the normalisation factors $\sqrt{2/N}$ that appear in both the forward and inverse transforms could be merged as $2/N$ and moved to either the forward or inverse transforms. In the following however the normalisation factor $\sqrt{2/N}$ will be kept in both the forward and the inverse transforms.

Furthermore, both the DST-IV and the DCT-IV can be computed through the DCT. In the above cited book by K. R. Rao et al, the software code for the computation of the DCT-IV and the DST-IV through the DCT is given.

Suppose that the DCTs of $y_i$ and $z_i$ are denoted as $Y_k$ and $Z_k$ respectively for $k=0,1,\ldots,(N/2)-1$.

Two problems are addressed here:
(a) the computation of the N-point DCT of $x_i$ by using only (N/2)-point transformations, and
(b) the computation of the N-point DCT of $x_i$ when $Y_k$ and $Z_k$ are known (i.e. one has the DCT coefficients of the N/2-point sequences, $y_i$ and $z_i$).

Consider the even-indexed output of $X_k$.

It should be noted that variables l and n are used interchangeably in the following equations.

From eq. (1), for k=2k $$\begin{aligned} X_{2k} &= \sqrt{\frac{2}{N}} \varepsilon_{2k} \sum_{n=0}^{N-1} x_n \cos\frac{(2n+1)2k\pi}{2N} \\ &= \sqrt{\frac{2}{N}} \varepsilon_k \left\{ \sum_{n=0}^{\frac{N}{2}-1} x_n \cos\frac{(2n+1)k\pi}{2N} + \sum_{n=N/2}^{N-1} x_n \cos\frac{(2n+1)k\pi}{(2N/2)} \right\} \\ &= \sqrt{\frac{2}{N}} \varepsilon_k \left\{ \sum_{n=0}^{\frac{N}{2}-1} y_n \cos\frac{(2n+1)k\pi}{(2N/2)} + \sum_{n=0}^{\frac{N}{2}-1} x_{N-l-n} \cos\left[\frac{(2(N-1-n)+1)k\pi}{(2N/2)}\right] \right\} \\ &= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{(2N/2)} + \sqrt{\frac{2}{N/2}} \varepsilon_k \sum_{n=0}^{\frac{N}{2}-1} z_n \cos\frac{(2n+1)k\pi}{(2N/2)} \right\} \\ &= \sqrt{\frac{1}{2}} [Y_k + (-1)^k Z_k] \\ &= \sqrt{\frac{1}{2}} [Y_k + Z'_k] \end{aligned} \quad (8)$$

$k = 0, 1, \ldots, (N/2) - 1.$ where $Z'_k$ are the DCT-II coefficients of $z'_n = x_{N-1-n}$ for $n=0,1,\ldots,(N/2)-1$. Equation (8) denotes that the even-indexed DCT coefficients of $x_i$ can be computed by the DCT coefficients of $y_i$ and $z_i$, i.e. the even indexed DCT coefficients of the N-element array can be obtained from the DCT coefficients of the two adjacent N/2 element arrays.

Furthermore, let $R_k$ be the odd-indexed coefficients, i.e. $R_k = X_{2k+1}$. Then by defining $$R'_k = R_k + R_{k-1} \quad (9)$$

then $$R'_k = X_{2k+1} + X_{2k-1} \quad (9a)$$

$$= \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1} (y_n - z'_n) 2\cos\frac{(2n+1)\pi}{2N} \cos\frac{(2n+1)k\pi}{2(N/2)} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} \text{ or }$$

$$= \frac{1}{\varepsilon_k}\sqrt{\frac{1}{2}} \{\text{length-}N/2 \text{ DCT-II of } r_n\}$$

where $$r_n = (y_n - z'_n) 2\cos\frac{(2n+1)\pi}{2N} \quad (9b)$$

$$= \left\{ \sqrt{\frac{2}{N/2}} \sum_{l=0}^{\frac{N}{2}-1} \varepsilon_l Y_l \cos\frac{(2n+1)l\pi}{2(N/2)} - \sqrt{\frac{2}{N/2}} \sum_{l=0}^{\frac{N}{2}-1} \varepsilon_l Z'_l \cos\frac{(2n+1)l\pi}{2(N/2)} \right\} 2\cos\frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos\frac{(2n+1)l\pi}{2(N/2)} \right\} 2\cos\frac{(2n+1)\pi}{2N}$$

$$= g_n 2\cos\frac{(2n+1)\pi}{2N}$$

where
$g_n$ is a length-N/2 IDCT of $(Y_i - Z'_i)$.

Hence $R'_k$ is calculated by means of a DCT-II of $r_n$, where $r_n$ is computed as the IDCT-II of the differences $Y_i - Z'_i$ multiplied by cosine factors. Both the DCT and the IDCT are of length-N/2.

The odd-indexed outputs $R_k$ of the length-N DCT of $x_n$ are calculated from equation (9) as $$R_k = R'_k - R_{k-1} \quad (10)$$

Due to the symmetry of the cosine function it is concluded that $$R_0 = R_{-1} \quad (11a)$$

and based on this and equation (9)

$$R_0 = \frac{1}{2} R'_0 \quad (11b)$$

For the computation of the even-indexed coefficients only N/2 additions are necessary. For the computation of the odd-indexed coefficients N/2+(N/2−1) additions, N/2 multiplications, one length-N/2 IDCT and one length-N/2 DCT are required. This results to a total of $M_N$ multiplications and $A_N$ additions according to the following formulae:

$$M_N = (N/2) + 2M_{N/2} \quad (12a)$$

$$A_N = (3N/2) - 1 + 2A_{N/2} \quad (12b)$$

where $M_{N/2}/A_{N/2}$ is the number of multiplications/additions of a length-N/2 DCT.

Based on the initial values $M_2 = 1$, $A_2 = 2$ the above equations become:

$$M_N = (N/2) \log_2 N \quad (13a)$$

$$A_N = (3N/2) \log_2 N - N + 1 \quad (13b)$$

The complexity is equal to that of a length-N fast DCT computation according to well known fast algorithms, such as the ones described in H. S. Hou: "A Fast Recursive Algorithm for Computing the Discrete Cosine Transform", *IEEE Trans on ASSP*, Vol. ASSP-35, pp. 1445-1461, October 1987., S. C. Chan and K. L. Ho: "Direct Methods for Computing Discrete Sinusoidal Transform", *IEE Proceedings*, Vol. 137, Pt. F, No. 6, pp. 433-442, December 1990 and C. W. Kok: "Fast Algorithm for Computing Discrete Cosine Transform", *IEEE Trans on Signal Processing*, Vol. 45, No. 3, pp. 757-760, March 1997.

If the multiplications by $1/\sqrt{2}$ are taken into account, then N−1 multiplications are needed in addition and 1 'shift right' for multiplying by ½. However, all these multiplications could be absorbed within the quantiser that follows the DCT stage. The computational complexity given above could be greatly reduced if the sparseness of the data and the weight matrices were taken into account. Notice that for a downsampling by a factor of two, the computational complexity is reduced even more, since only half of the coefficients in equations (7b) and (9a) need to be computed. Another way to calculate the odd-indexed DCT coefficients of $X_k$ is as follows. For k=2k+1, eq. (1) becomes:

$$X_{2k+1} = \sqrt{\frac{2}{N}} \varepsilon_{2k+1} \sum_{i=0}^{N-1} x_i \cos\frac{(2i+1)(2k+1)\pi}{2N} \quad (14)$$

$$= \sqrt{\frac{2}{N}} \left\{ \sum_{i=0}^{\frac{N}{2}-1} x_i \cos\frac{(2i+1)(2k+1)\pi}{2N} + \sum_{i=0}^{\frac{N}{2}-1} x_{i+N/2}\cos\frac{(2i+N+1)(2k+1)\pi}{2N} \right\}$$

$$= \sqrt{\frac{2}{N}} \left\{ \sum_{i=0}^{\frac{N}{2}-1} y_i \cos\frac{(2i+1)(2k+1)\pi}{2N} + \sum_{i=0}^{\frac{N}{2}-1} z_i \cos\left[\frac{(2i+1)(2k+1)\pi}{2N} + \left(k\pi + \frac{\pi}{2}\right)\right] \right\}$$

$$= \sqrt{\frac{2}{N}} \left\{ \sum_{i=0}^{\frac{N}{2}-1} y_i \cos\frac{(2i+1)(2k+1)\pi}{2N} + (-1)^{k+1} \sum_{i=0}^{\frac{N}{2}-1} z_i \sin\frac{(2i+1)(2k+1)\pi}{2N} \right\}$$

$$= \sqrt{\frac{2}{N}} (X1_k - (-1)^k X2_k), k = 0, 1, \ldots, (N/2)-1.$$

Notice that $X1_k$ is the DCT-IV of $y_i$ and $X2_k$ is the DST-IV of $z_i$. This means that $X_{2k+1}$ can be computed by N/2 point transformations. Since the DCT-IV and the DST-IV can be computed through the DCT, this concludes that $X_{2k+1}$ can be computed by a N/2 point DCT. From equation (8), $X_{2k}$ can be computed by N/2 point DCTs and therefore an N-point DCT is not needed.
Below the terms $X1_k$ and $X2_k$ of equation (14) are further analysed.

$$X1_k = \sum_{i=0}^{\frac{N}{2}-1} y_i \cos\frac{(2i+1)(2k+1)\pi}{2N} = \quad (15)$$

$$= \sqrt{\frac{N/2}{2}} \sqrt{\frac{2}{N/2}} \sum_{i=0}^{\frac{N}{2}-1} \cos\frac{(2i+1)(2k+1)\pi}{2N} \left( \sqrt{\frac{2}{N/2}} \sum_{p=0}^{\frac{N}{2}-1} \varepsilon_p Y_p \cos\frac{(2i+1)p\pi}{2(N/2)} \right)$$

$$k = 0, 1, \ldots, (N/2)-1$$

where by definition $$y_i = \sqrt{\frac{2}{N/2}} \sum_{p=0}^{\frac{N}{2}-1} \varepsilon_p Y_p \cos\frac{(2i+1)p\pi}{2(N/2)} = IDCT_{N/2}^{II}(Y_p), \quad (16)$$

$$i = 0, 1, \ldots, (N/2)-1$$

Therefore $X1_k$ can be computed by an IDCT followed by a forward DCT-IV of size N/2 (and multiplied by $$\sqrt{\frac{2}{N/2}} ).$$

Notice that the cos(.) terms in eq. (15), can be pre-computed and stored.

In a similar manner, $X2_k$ can be calculated as:

$$X2_k = \sum_{i=0}^{\frac{N}{2}-1} z_i \sin\frac{(2i+1)(2k+1)\pi}{2N} =$$

$$= \sqrt{\frac{N/2}{2}}\left(\sqrt{\frac{2}{N/2}}\sum_{i=0}^{\frac{N}{2}-1}\sin\frac{(2i+1)(2k+1)\pi}{2N}\sqrt{\frac{2}{N/2}}\sum_{p=0}^{\frac{N}{2}-1}\varepsilon_p Z_p \cos\frac{(2i+1)p\pi}{2(N/2)}\right),$$ (17)

$k = 0, 1, \ldots, (N/2) - 1$ where by definition $$z_i = \sqrt{\frac{2}{N/2}}\sum_{p=0}^{\frac{N}{2}-1}\varepsilon_p Z_p \cos\frac{(2i+1)p\pi}{2(N/2)} = IDCT_{N/2}^{II}(Z_p),$$ (18)

$i = 0, 1, \ldots, (N/2) - 1$

Therefore $X2_k$, can be computed by an inverse DCT followed by a forward DST-IV of size N/2 (and multiplied by $$\sqrt{\frac{2}{N/2}}).$$

Notice that the cos(.) terms in eq. (17), can be pre-computed and stored.

Notice that in equations (15) and (17), a fast algorithm can be used for the computation of the DST-IV and DCT-IV as the one described in H.-C. Chiang and J.-C. Liu, "A progressive structure for on-line computation of arbitrary length DCT-IV and DST-IV transforms", *IEEE Trans. On Circuits and Systems for Video Technology*, Vol. 6, No. 6, pp. 692-695, December 1996.

Alternatively, both the DCT-IV and the DST-IV can be computed through the DCT as explained in Z. Wang, "On computing the Discrete Fourier and Cosine Transforms", *IEEE Trans. On Acoustics, Speech and Signal Processing*, Vol. ASSP-33, No. 4, pp. 1341-1344, October 1985.

Therefore, a separate DCT-IV or DST-IV module is not required. DCT and IDCT is used only. Furthermore, for N=16, a 16 point DCT is not required and the standard 8 point DCT can be used. This further reduces the complexity of the circuits required. Notice also that the cascaded operations of IDCT and DCT-IV (eq. 15) as well as IDCT and DST-IV (eq. 17), which are all of size N/2, can be replaced by a single N-point IDCT that can be used on a multiplexed basis, as described in N. R. Murthy and M. N. S. Swamy, "On a novel decomposition of the DCT and its applications", *IEEE Trans. On Signal Processing*, Vol. 41, No. 1, pp. 480-485, January 1993.

This has certain advantages in a hardware implementation of the algorithm. These equations therefore imply that standard available DCT hardware can be used to compute the N-point DCT by having the DCT coefficients of the 2 adjacent blocks of N/2 points that constitute the N points.

The computational complexity of the algorithm depends on the algorithm used for the computation of the DCT and IDCT. The computational complexity appears to be similar to the complexity of a scheme that implements two inverse DCTs of size N/2 and a forward DCT of size N. However, such a scheme would require a N point DCT which is not advantageous, since it is supposed that N/2-point DCTs are available. Furthermore, the memory requirements are reduced in this scheme since an N-point DCT is not needed.

Notice that the above algorithms will compute all N DCT points. In practice this is not required for applications where image downsampling is performed. For example, for downsampling by a factor of 2 we have to keep the 8 out of every 16 DCT points of $x_i$. Therefore, k=0,1, . . . , (N/4)-1 in equations 8, 9, 10, 12. Pruning DCT algorithms as in A. N. Skodras, "Fast Discrete Cosine Transform Pruning", *IEEE Trans. On Signal Processing*, Vol. 42, No. 7, pp. 1833-1837, July 1994, can be used in that case to compute only the required number of DCT points.

The equations given above can be further analysed and simplified. The detailed analysis follows below based on equation (14) and separate analysis of $X1_k$ and $X2_k$. Parts of equations derived in the previous paragraph are repeated for clarification purposes.

From equation (14)

$$X1_k = \sum_{i=0}^{\frac{N}{2}-1} y_i \cos\frac{(2i+1)(2k+1)\pi}{2N} =$$

$$= \sum_{i=0}^{\frac{N}{2}-1}\cos\frac{(2i+1)(2k+1)\pi}{2N}\left(\sqrt{\frac{2}{N/2}}\sum_{p=0}^{\frac{N}{2}-1}\varepsilon_p Y_p \cos\frac{(2i+1)p\pi}{2(N/2)}\right)$$ (19)

-continued $$= \sum_{i=0}^{\frac{N}{2}-1} \cos\frac{(2i+1)(2k+1)\pi}{2N} \sqrt{\frac{2}{N/2}} \left\{ \sum_{p=0}^{\frac{N}{4}-1} \varepsilon_{2p} Y_{2p} \cos\frac{(2i+1)p\pi}{(2N/4)} + \sum_{p=0}^{\frac{N}{4}-1} \varepsilon_{2p+1} Y_{2p+1} \cos\frac{(2i+1)(2p+1)\pi}{2(N/2)} \right\}$$

By defining the sequences Y1 and Y2 as:

$$Y1_p = Y_{2p} \quad Y2_p = Y_{2p+1} \quad \text{for } p = 0, 1, \ldots, N/4 \tag{20}$$

equation (19) becomes $$X1_k = \sum_{i=0}^{\frac{N}{2}-1} \cos\frac{(2i+1)(2k+1)\pi}{2N} \sqrt{\frac{2}{N/2}} \left\{ \sum_{p=0}^{\frac{N}{4}-1} \varepsilon_p Y1_p \cos\frac{(2i+1)p\pi}{2(N/4)} + \sum_{p=0}^{\frac{N}{4}-1} Y2_p \cos\frac{(2i+1)(2p+1)\pi}{2(N/2)} \right\} \tag{21}$$

$$= \sum_{i=0}^{\frac{N}{2}-1} \cos\frac{(2i+1)(2k+1)\pi}{2N} \frac{1}{\sqrt{2}} \left\{ \sqrt{\frac{2}{N/4}} \sum_{p=0}^{\frac{N}{4}-1} \varepsilon_p Y1_p \cos\frac{(2i+1)p\pi}{2(N/4)} + \sqrt{\frac{2}{N/4}} \sum_{p=0}^{\frac{N}{4}-1} Y2_p \cos\frac{(2i+1)(2p+1)\pi}{4(N/4)} \right\}$$

Equation (21) can be subdivided further into:

$$X1_k = \sum_{i=0}^{\frac{N}{4}-1} \cos\frac{(2i+1)(2k+1)\pi}{2N} \frac{1}{\sqrt{2}} \left\{ \sqrt{\frac{2}{N/4}} \sum_{p=0}^{\frac{N}{4}-1} \varepsilon_p Y1_p \cos\frac{(2i+1)p\pi}{2(N/4)} + \sqrt{\frac{2}{N/4}} \sum_{p=0}^{\frac{N}{4}-1} Y2_p \cos\frac{(2i+1)(2p+1)\pi}{4(N/4)} \right\} + \tag{22}$$

$$\sum_{i=N/4}^{\frac{N}{2}-1} \cos\frac{(2i+1)(2k+1)\pi}{2N} \frac{1}{\sqrt{2}} \left\{ \sqrt{\frac{2}{N/4}} \sum_{p=0}^{\frac{N}{4}-1} \varepsilon_p Y1_p \cos\frac{(2i+1)p\pi}{2(N/4)} + \sqrt{\frac{2}{N/4}} \sum_{p=0}^{\frac{N}{4}-1} Y2_p \cos\frac{(2i+1)(2p+1)\pi}{4(N/4)} \right\}$$

By defining $$y1'_i = \sqrt{\frac{2}{N/4}} \sum_{p=0}^{\frac{N}{4}-1} \varepsilon_p Y1_p \cos\frac{(2i+1)p\pi}{2(N/4)}, \tag{23}$$

$i = 0, 1, \ldots, (N/4) - 1$
and $$y2'_i = \sqrt{\frac{2}{N/4}} \sum_{p=0}^{\frac{N}{4}-1} Y2_p \cos\frac{(2i+1)(2p+1)\pi}{4(N/4)}, \tag{24}$$

$i = 0, 1, \ldots, (N/4) - 1$ it is seen that $y1'_i$ is the IDCT of $Y1_p$ of N/4 points and $y2'_i$ is the IDCT-IV of $Y2_p$ of N/4 points.

Notice that when Y1 and/or Y2 are zero, then $y1'_i$ and/or $y2'_i$ do not need to be computed. This will speed-up the calculation of equation (22).

Further analysis of the second term of equation (22) gives:

$$\sum_{i=N/4}^{\frac{N}{2}-1} \cos\frac{(2i+1)(2k+1)\pi}{2N} \frac{1}{\sqrt{2}} \left\{ \sqrt{\frac{2}{N/4}} \sum_{p=0}^{\frac{N}{4}-1} \varepsilon_p Y1_p \cos\frac{(2i+1)p\pi}{2(N/4)} + \sqrt{\frac{2}{N/4}} \sum_{p=0}^{\frac{N}{4}-1} Y2_p \cos\frac{(2i+1)(2p+1)\pi}{4(N/4)} \right\} = \quad (25)$$

$$\sum_{i=0}^{\frac{N}{4}-1} \cos\frac{\left(2i+1+\frac{N}{2}\right)(2k+1)\pi}{2N} \frac{1}{\sqrt{2}} \left\{ \sqrt{\frac{2}{N/4}} \sum_{p=0}^{\frac{N}{4}-1} \varepsilon_p Y1_p \cos\frac{\left(2i+1+\frac{N}{2}\right)p\pi}{2(N/4)} + \sqrt{\frac{2}{N/4}} \sum_{p=0}^{\frac{N}{4}-1} Y2_p \cos\frac{\left(2i+1+\frac{N}{2}\right)(2p+1)\pi}{4(N/4)} \right\} =$$

$$\sum_{i=0}^{\frac{N}{4}-1} \cos\frac{\left(2i+1+\frac{N}{2}\right)(2k+1)\pi}{2N} \frac{1}{\sqrt{2}} \left\{ \sqrt{\frac{2}{N/4}} \sum_{p=0}^{\frac{N}{4}-1} \varepsilon_p (-1)^p Y1_p \cos\frac{(2i+1)p\pi}{2(N/4)} + \sqrt{\frac{2}{N/4}} \sum_{p=0}^{\frac{N}{4}-1} (-1)^{p+1} Y2_p \sin\frac{(2i+1)(2p+1)\pi}{4(N/4)} \right\}$$

By defining $$y1''_i = \sqrt{\frac{2}{N/4}} \sum_{p=0}^{\frac{N}{4}-1} \varepsilon_p (-1)^p Y1_p \cos\frac{(2i+1)p\pi}{2(N/4)}, \quad (26)$$

$$i = 0, 1, \ldots, (N/4)-1$$

$$y2''_i = \sqrt{\frac{2}{N/4}} \sum_{p=0}^{\frac{N}{4}-1} (-1)^{p+1} Y2_p \sin\frac{(2i+1)(2p+1)\pi}{4(N/4)}, \quad (27)$$

$$i = 0, 1, \ldots, (N/4)-1$$

$y1''_i$ is recognised as the IDCT of sequence $(-1)^p Y1_p$ of N/4 points and $y2''_i$ is recognised as the IDST-IV of sequence $(-1)^{p+1}Y2_p$, of N/4 points.

Notice that when Y1 and/or Y2 are zero, then $y1''_i$ and/or $y2''_i$ do not need to be computed. This will speed-up the calculation of equation (25).

From equations (15), (16), (18) and (19), it is seen that $$X1_k = \frac{1}{\sqrt{2}} \left\{ \sum_{i=0}^{\frac{N}{4}-1} \cos\frac{(2i+1)(2k+1)\pi}{2N}(y1'_i + y2'_i) + \sum_{i=0}^{\frac{N}{4}-1} \cos\frac{\left(2i+1+\frac{N}{2}\right)(2k+1)\pi}{2N}(y1''_i + y2''_i) \right\} \quad (28)$$

$$k = 0, 1, \ldots, (N/2)-1$$

In similar manner, the second term of equation (14), can be analysed as follows:

$$X2_k = \sum_{i=0}^{\frac{N}{2}-1} z_i \sin\frac{(2i+1)(2k+1)\pi}{2N} = \quad (29)$$

$$= \sum_{i=0}^{\frac{N}{2}-1} \sin\frac{(2i+1)(2k+1)\pi}{2N} \sqrt{\frac{2}{N/2}} \sum_{p=0}^{\frac{N}{2}-1} \varepsilon_p Z_p \cos\frac{(2i+1)p\pi}{2(N/2)}$$

$$= \sum_{i=0}^{\frac{N}{2}-1} \sin\frac{(2i+1)(2k+1)\pi}{2N} \sqrt{\frac{2}{N/2}} \left\{ \sum_{p=0}^{\frac{N}{4}-1} \varepsilon_{2p} Z_{2p} \cos\frac{(2i+1)p\pi}{2(N/4)} + \sum_{p=0}^{\frac{N}{4}-1} \varepsilon_{2p+1} Z_{2p+1} \cos\frac{(2i+1)(2p+1)\pi}{2(N/2)} \right\}$$

$$= \sum_{i=0}^{\frac{N}{2}-1} \sin\frac{(2i+1)(2k+1)\pi}{2N} \sqrt{\frac{1}{2}} \left\{ \sqrt{\frac{2}{N/2}} \sum_{p=0}^{\frac{N}{4}-1} \varepsilon_p Z1_p \cos\frac{(2i+1)p\pi}{2(N/4)} + \sqrt{\frac{2}{N/4}} \sum_{p=0}^{\frac{N}{4}-1} Z2_p \cos\frac{(2i+1)(2p+1)\pi}{4(N/4)} \right\}$$

where $$Z1_p = Z_{2p} \quad Z2_p = Z_{2p+1} \quad \text{for } p = 0, 1, \ldots, N/4 \quad (30)$$

Equation (29) can be further subdivided to:

$$X2_k = \sum_{i=0}^{\frac{N}{4}-1} \sin\frac{(2i+1)(2k+1)\pi}{2N}\sqrt{\frac{1}{2}}\left\{\sqrt{\frac{2}{N/4}}\sum_{p=0}^{\frac{N}{4}-1}\varepsilon_p Z1_p\cos\frac{(2i+1)p\pi}{2(N/4)} + \sqrt{\frac{2}{N/4}}\sum_{p=0}^{\frac{N}{4}-1}Z2_p\cos\frac{(2i+1)(2p+1)\pi}{4(N/4)}\right\} + \quad (31)$$

$$\sum_{i=N/4}^{\frac{N}{2}-1} \sin\frac{(2i+1)(2k+1)\pi}{2N}\sqrt{\frac{1}{2}}\left\{\sqrt{\frac{2}{N/4}}\sum_{p=0}^{\frac{N}{4}-1}\varepsilon_p Z1_p\cos\frac{(2i+1)p\pi}{2(N/4)} + \sqrt{\frac{2}{N/4}}\sum_{p=0}^{\frac{N}{4}-1}Z2_p\cos\frac{(2i+1)(2p+1)\pi}{4(N/4)}\right\}$$

By defining $$z1'_i = \sqrt{\frac{2}{N/4}}\sum_{p=0}^{\frac{N}{4}-1}\varepsilon_p Z1_p\cos\frac{(2i+1)p\pi}{2(N/4)}, \quad (32)$$

$$i = 0, 1, \ldots, (N/4)-1$$

$$z2'_i = \sqrt{\frac{2}{N/4}}\sum_{p=0}^{\frac{N}{4}-1}Z2_p\cos\frac{(2i+1)(2p+1)\pi}{4(N/4)}, \quad (33)$$

$$i = 0, 1, \ldots, (N/4)-1$$

It is seen that $z1'_i$ is the IDCT of sequence $Z1_p$ of N/4 points and $z2'_i$ is the IDCT-IV of sequence $Z2_p$ of N/4 points.

Notice that when $Z1_p$ and/or $Z2_p$ are zero, then $z1''_i$ and/or $z2''_i$ do not need to be computed. This speeds-up the calculation of equation (31).

Further analysis of the second term of equation (31) gives:

$$\sum_{i=N/4}^{\frac{N}{2}-1}\sin\frac{(2i+1)(2k+1)\pi}{2N}\frac{1}{\sqrt{2}}\left\{\sqrt{\frac{2}{N/4}}\sum_{p=0}^{\frac{N}{4}-1}\varepsilon_p Z1_p\cos\frac{(2i+1)p\pi}{2(N/4)} + \sqrt{\frac{2}{N/4}}\sum_{p=0}^{\frac{N}{4}-1}Z2_p\cos\frac{(2i+1)(2p+1)\pi}{4(N/4)}\right\} = \quad (34)$$

$$\sum_{i=0}^{\frac{N}{4}-1}\sin\frac{\left(2i+1+\frac{N}{2}\right)(2k+1)\pi}{2N}\frac{1}{\sqrt{2}}\left\{\sqrt{\frac{2}{N/4}}\sum_{p=0}^{\frac{N}{4}-1}\varepsilon_p Z1_p\cos\frac{\left(2i+1+\frac{N}{2}\right)p\pi}{2(N/4)} + \sqrt{\frac{2}{N/4}}\sum_{p=0}^{\frac{N}{4}-1}Z2_p\cos\frac{\left(2i+1+\frac{N}{2}\right)(2p+1)\pi}{4(N/4)}\right\} =$$

$$\sum_{i=0}^{\frac{N}{4}-1}\sin\frac{\left(2i+1+\frac{N}{2}\right)(2k+1)\pi}{2N}\frac{1}{\sqrt{2}}\left\{\sqrt{\frac{2}{N/4}}\sum_{p=0}^{\frac{N}{4}-1}\varepsilon_p(-1)^p Z1_p\cos\frac{(2i+1)p\pi}{2(N/4)} + \sqrt{\frac{2}{N/4}}\sum_{p=0}^{\frac{N}{4}-1}(-1)^{p+1}Z2_p\sin\frac{(2i+1)(2p+1)\pi}{4(N/4)}\right\}^0$$

By defining $$z1''_i = \sqrt{\frac{2}{N/4}}\sum_{p=0}^{\frac{N}{4}-1}\varepsilon_p(-1)^p Z1_p\cos\frac{(2i+1)p\pi}{2(N/4)}, \quad (35)$$

$$i = 0, 1, \ldots, (N/4)-1$$

$$z2''_i = \sqrt{\frac{2}{N/4}}\sum_{p=0}^{\frac{N}{4}-1}(-1)^{p+1}Z2_p\sin\frac{(2i+1)(2p+1)\pi}{4(N/4)}, \quad (36)$$

$$i = 0, 1, \ldots, (N/4)-1$$

It is seen that $z1''_i$ is the IDCT of sequence $(-1)^p Z1_p$ of N/4 points and $z2''_i$ is the IDST-IV of sequence $(-1)^{p+1}Z2_p$ of N/4 points. Notice that when $Z1_p$ and/or $Z2_p$ are zero, then $z1''_i$ and/or $z2''_i$ do not need to be computed. This speeds-up the calculation of equation (34).

From equations (31), (32), (33), (34), (35) and (36) it is seen that:

$$X2_k = \frac{1}{\sqrt{2}}\left\{\sum_{i=0}^{\frac{N}{4}-1}\sin\frac{(2i+1)(2k+1)\pi}{2N}(z1'_i + z2'_i) + \sum_{i=0}^{\frac{N}{4}-1}\sin\frac{\left(2i+1+\frac{N}{2}\right)(2k+1)\pi}{2N}(z1''_i + z2''_i)\right\} \quad (37)$$

Therefore, the odd indexed DCT coefficients can be computed from equation $$X_{2k+1} = \sqrt{\frac{2}{N}} (X1_k - (-1)^k X2_k), k = 0, 1, \ldots, (N/2)-1. \quad (38)$$

Notice that in eq. (8b) and (38), the values of k will be k=0,1, ..., (N/4)−1, for a downsampling by a factor of 2.

Figure 5:
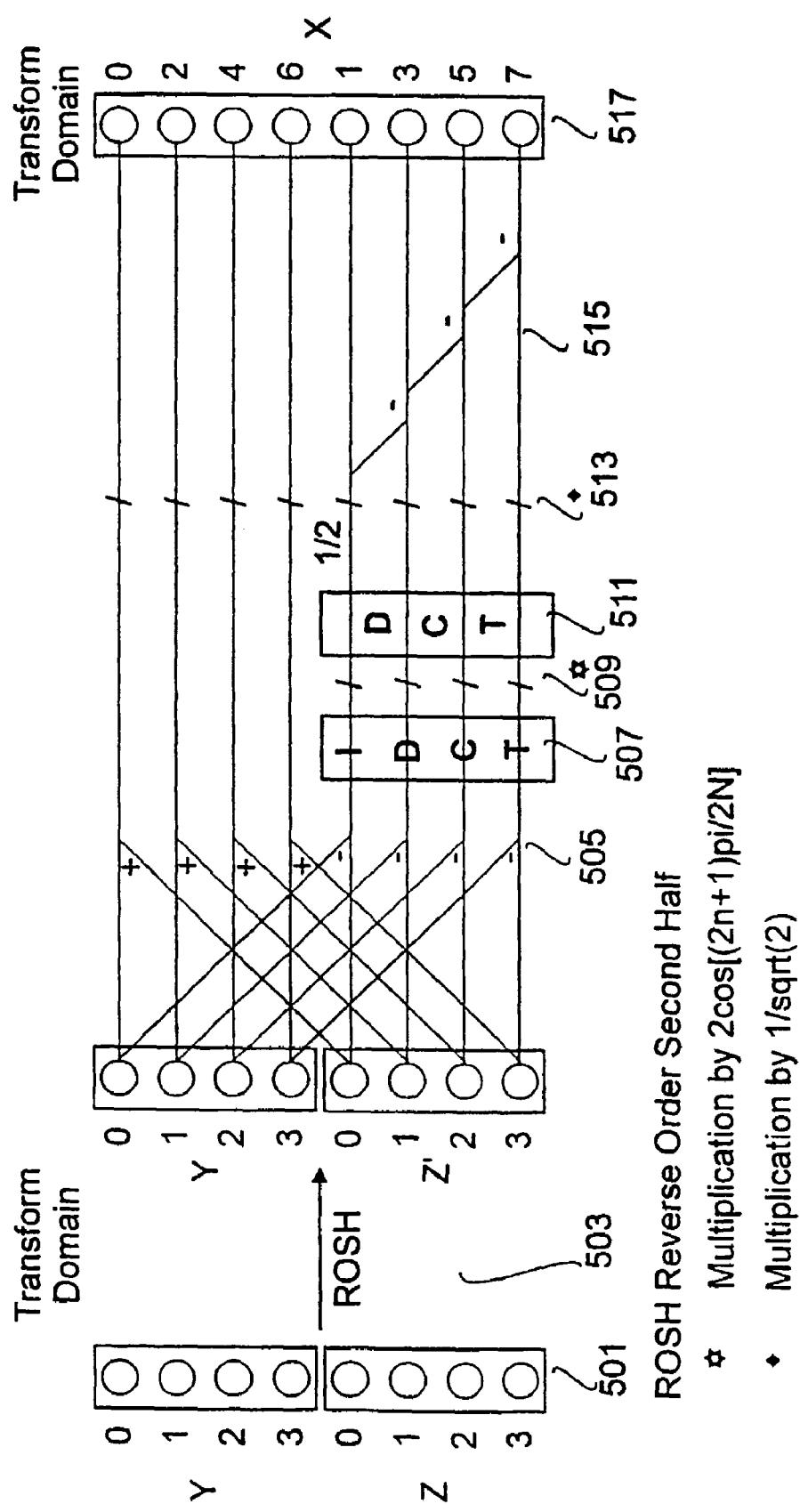
FIG. 5 is an illustration of the steps performed in the DCT domain when executing the algorithm as described herein.

In FIG. 5, an illustration of the steps performed in the DCT domain when executing the algorithm according to the equations (8) and (9). Thus, first the two sequences of length N/2, (N=8 in this example), Y and Z are input at 501. Next, the second sequence Z is reversed in a step 503 and a sequence Z' is produced.

The upper four lines in FIG. 5 show how the even indexed coefficients are calculated according to equation 8. The coefficients of Y are added with the appropriate coefficients of Z' in a step 505 and are multiplied by $1/\sqrt{2}$ at 513 in order to produce the even indexed coefficients of X at 517.

The lower four lines show how the odd indexed DCT coefficients of X are produced. First sequence Y-Z' (see equation 9b) is produced in the step 505, and an inverse DCT transform (IDCT) is applied to this sequence at step 507. The resulting coefficients are multiplied by appropriate factors, i.e.

$$2\cos\frac{(2n+1)\pi}{2N}$$

where n goes from 0 to N/2−1, i.e. in this example from 0 to 3, at step 509 which produce sequence $r_n$ of equation 9b. Then, at step 511, a DCT is performed on this sequence and the resulting coefficients are multiplied by $1/\sqrt{2}$ at step 513, as above. Notice that because of equation 11b, the first coefficient after the DCT transformation also has to be multiplied by ½ this is also performed at step 513. After this, at step 515, equation 10 is performed. Thus, in the step 515 the fifth coefficient is subtracted from the sixth, the new sixth from the seventh and the new seventh is subtracted from the eighth coefficient.

The coefficients of the sequence X can now be output in a step 517 in the order, from top to bottom in FIG. 5, X(0) X(2) X(4) X(6) X(1) X(3) X(5) X(7).

Figure 2:
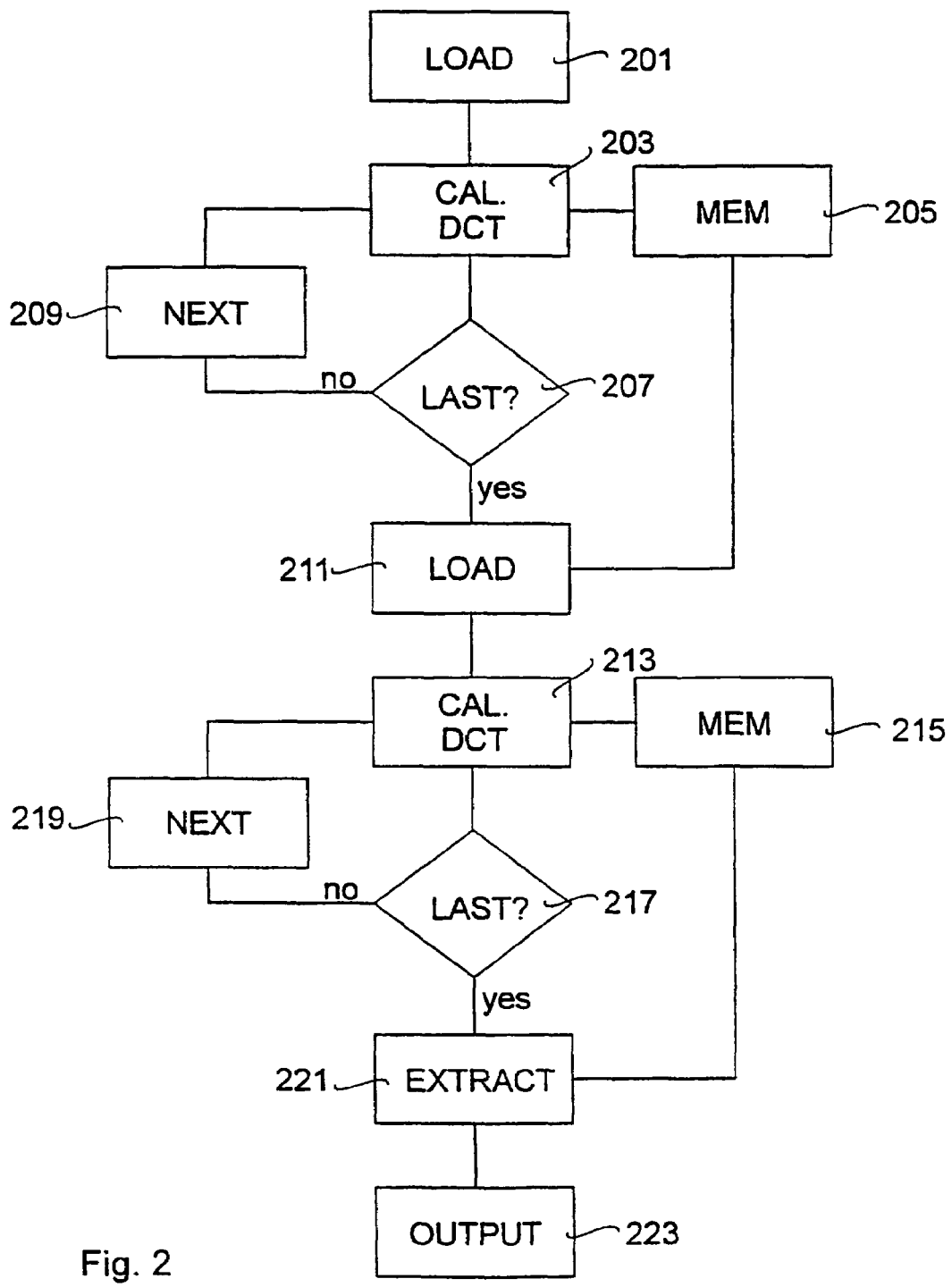
FIG. 2 is a flow chart, which shows the different steps carried out when transcoding a CIF image to QCIF in the DCT domain.

Thus, for example, an image of QCIF format can be derived from an image in a CIF format without having to use any other transforms than 8×8 DCTs, if the CIF image were processed by using DCT applied in 8×8 blocks, by using the following method illustrated in the flow chart in FIG. 2.

First in block 201 four 8×8 adjacent DCT-point arrays of a CIF format image are loaded into a memory as an array of size 16×16 points. Next, the 16-point DCT for each row of the 16×16 array is calculated in a block 203 using the equations (8) and (9) for the even and odd coefficients, respectively. Then, the coefficients of that row are stored in a memory 205.

Thereupon it is checked in a block 207 if the current row was the last in the 16×16 array. If this is not the case the row number is incremented in a block 209 and the calculations in block 203 are repeated for the next row of the 16×16 array. If, on the other hand, the 16 DCT coefficients for the last row have been calculated and stored in the memory, a block 211 fetches the 16×16 DCT coefficients now stored in the memory 205 and loads these into the block 211.

The procedure then continues in a similar manner for the computation of the columns, i.e. the method is applied in a column manner to the result that has been obtained from the row-computation.

Hence, in a block 213 the DCT for the first column of the array loaded into the block 211 is calculated using the equations (8) and (9) for the even and odd coefficients, respectively, and the coefficients for that column are stored in a block 215. Thereupon, it is checked in a block 217 if the DCT for the column currently calculated is the last that is required. If this is not the case the column number is incremented by one in a block 219 for the next column of the 16×16 array and the calculations in block 213 are repeated for the next column of the 16×16 array.

If, on the other hand, the 16 DCT coefficients for the last column have been calculated and stored in the memory block 215, a block 221 fetches the 16×16 DCT coefficients stored in the memory 215 and loads these into the block 221.

Next, in the block 221, the 8×8 low frequency DCT coefficients are extracted from the 16×16 DCT coefficients. The 8×8 DCT coefficients are then output in a block 223.

If only the M×K (M rows and K columns) DCT coefficients are required then the computation of the rows remains the same but then for each row, only the first K coefficients are computed. Then, during the computation of the columns, the first K columns are processed and for each of these columns the low frequency M coefficients are calculated. This method is useful for undersampling by a different factor in each dimension (for example undersampling by 2 in dimension x and by 4 in dimension y). Thereafter the M×K low frequency coefficients of the in this manner obtained 16×16-point DCT are extracted and transmitted. The method can also be applied in a similar manner to compute arbitrary number of DCT coefficients for each row/column.

The method can be used in a number of different applications. As an example, suppose that an image compression scheme like JPEG, uses 8×8 DCTs. Suppose that the compressed image is received. An undersampling (downsampling) of the image by a factor of 2 in each dimension would require keeping the low frequency 8×8 DCT coefficients out of a block of 16×16 DCT coefficients. These 16×16 DCT blocks can be computed with the method described above by having the 4(8×8) DCT coefficients that constitute the 16×16 block.

Notice that in the Row-Column (RC) computation, a further speed-up can be obtained if the coefficients of a certain row/column are zero, which normally is the case for high frequency DCT coefficients. In practice, in video coding about 80% of DCT coefficients are zero, i.e. the ones corresponding to high frequencies. Therefore, faster computation can be achieved by taking this information into account. For example, if all DCT coefficients of the two sub-rows of the fourth row of Z are zero, there is no reason to try to compute the DCT coefficients for that row. Another case can for example be if the DCT coefficients of row 3 of $\Phi_2$ are zero, all computations involving these coefficients can then be skipped.

Notice that the scheme can be applied in a recursive manner. For example, if QCIF, CIF and SCIF are required then 8×8 DCTs are used for the SCIF. The CIF is obtained by calculating the 8×8 DCTs of the 16×16 block that consists of 4(8×8) DCT coefficients of the SCIF. Then the QCIF can be obtained by keeping only the 4×4 out of the 8×8 DCT coefficients of each 8×8 block of the CIF or by again calculating the 8×8 DCTs of the 16×16 block that consists of 4(8×8) DCT coefficients of the CIF. This has interesting applications in scalable image/video coding schemes and in image/video transcoding with spatial resolution reduction schemes.

Alternatively, from each 8×8 blocks of DCT coefficients, one can keep only the 4×4 low frequency coefficients. Then from 4(4×4) blocks of DCT coefficients one can compute an 8×8 block of DCT coefficients.

The method as described herein has a number of advantages. Thus, standard DCT/IDCT hardware can be used, since there is no requirement of using 16×16 DCT, when 8×8 DCT/IDCT is available.

There is no requirement for fully decoding, filtering and downsampling in the spatial domain and fully encoding by DCT again. There are less memory requirements, since computation of a 16×16 DCT requires much more memory and data transfers compared to the 8×8 case.

The method can be used for undersampling by various factors. For example, if 8×8 DCTs are used and an undersampling by a factor of 4 in each dimension is desired, then only the low frequency 2×2 DCT coefficients out of the 8×8 are to be kept, which is not advantageous from a compression efficiency point of view. However, with the method as described herein one can calculate the 16×16 DCT coefficients out of the available 4(8×8) DCTs and keep only the 4×4 of them, or compute them directly. This is more efficient then by keeping the 2×2 out of the 4×4 and will result in better image quality. One can also compute an 8×8 block of DCT coefficients by 4(4×4) blocks of DCT coefficients. Each of the 4×4 blocks of DCT coefficients can be part of an 8×8 block of DCT coefficients.

The method results in fast computation when many of the DCT coefficients of the 8×8 blocks are zero, since computation of rows and columns DCTs/IDCTs can be avoided for that row/column.

Further, in L. H. Kieu and K. N. Ngan, "Cell-loss concealment techniques for layered video codecs in an ATM network", *IEEE Trans. On Image Processing,* Vol. 3, No. 5, pp. 666-677, September 1994, a frequency scalable video coding scheme is described. The scheme uses 8×8 DCTs for the upper layers. The base layer is coded using 4×4 DCTs. The low frequency 4×4 DCT coefficients of each of the 8×8 blocks of the upper layer are used at the base layer.

With the DCT algorithms as described herein, the frequency scalable video codec described in the above cited paper by L. H. Kieu et al. can be modified as follows:

Compute the low-frequency 8×8 DCT coefficients by applying the proposed algorithm in 4(8×8) blocks of DCT coefficients of the upper layer. Then code the base layer by standard techniques using 8×8 DCT algorithms. This as an efficient technique for all frequency scalable systems. The method has the following advantages in this case:

The video coding is applied in 8×8 blocks. This results in better coding efficiency compared to using 4×4 blocks. The motion vectors have to be computed for 8×8 blocks. Therefore less motion vectors need to be transmitted (or stored) compared to using 4×4 blocks. Also, variable length coding schemes are well studied for 8×8 DCT coefficients compared to the 4×4 case.

Notice that an alternative method would be to keep the 4×4 low frequency DCT coefficients of each 8×8 DCT block of the upper layer and by having 4(4×4) of these blocks to compute the 8×8 DCT of these 4×4 blocks. Such an approach is illustrated in FIG. 3.

Figure 3:
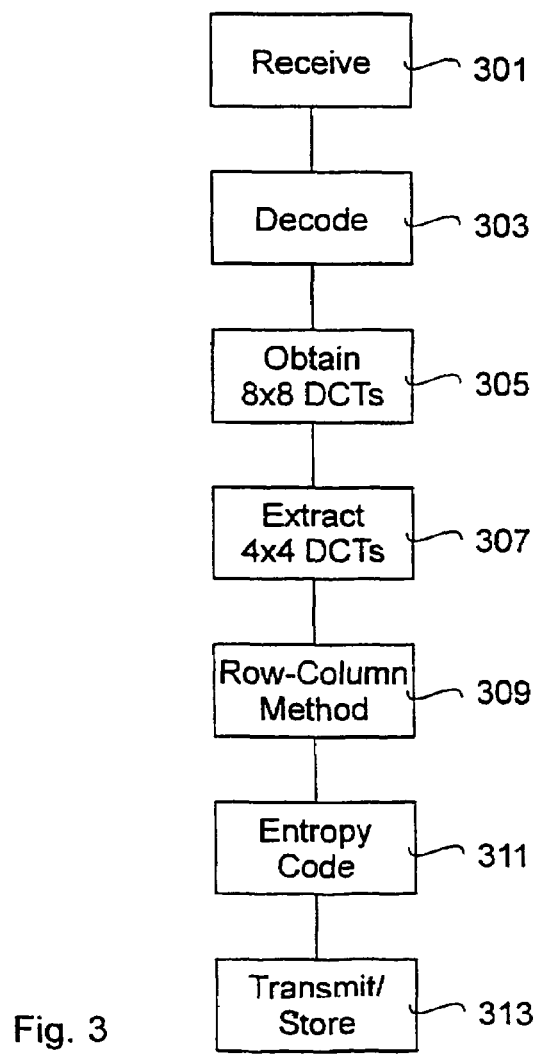
FIG. 3 is a flow chart illustrating different steps carried out when transcoding a still image by reducing this resolution by a factor 2 in each dimension.

Thus, in FIG. 3 a flow chart illustrating different steps carried out when transcoding a still image by reducing the resolution by a factor 2 in each dimension, is shown. First in a block 301 an image compressed in the DCT domain is received. The received image is then entropy decoded in a block 303, for example by a Huffman decoder or an arithmetic decoder.

Thereupon, in a block 305, 8×8 blocks of DCT coefficients of the decoded full size image are obtained, and in a block 307 the low-frequency 4×4 DCT coefficients from each 8×8 block are extracted. 8×8 DCTs are then obtained in a block 309 by means of applying the row-column method described above for four adjacent 4×4 blocks of low-frequency coefficients.

Next, each 8×8 blocks resulting from the row-column method in the block 309 is entropy coded in a block 311 and then transmitted or stored in a block 313. Notice that the DCT coefficients might have to re-quantized before entropy coding in order to achieve a specific compression factor.

Figure 4:
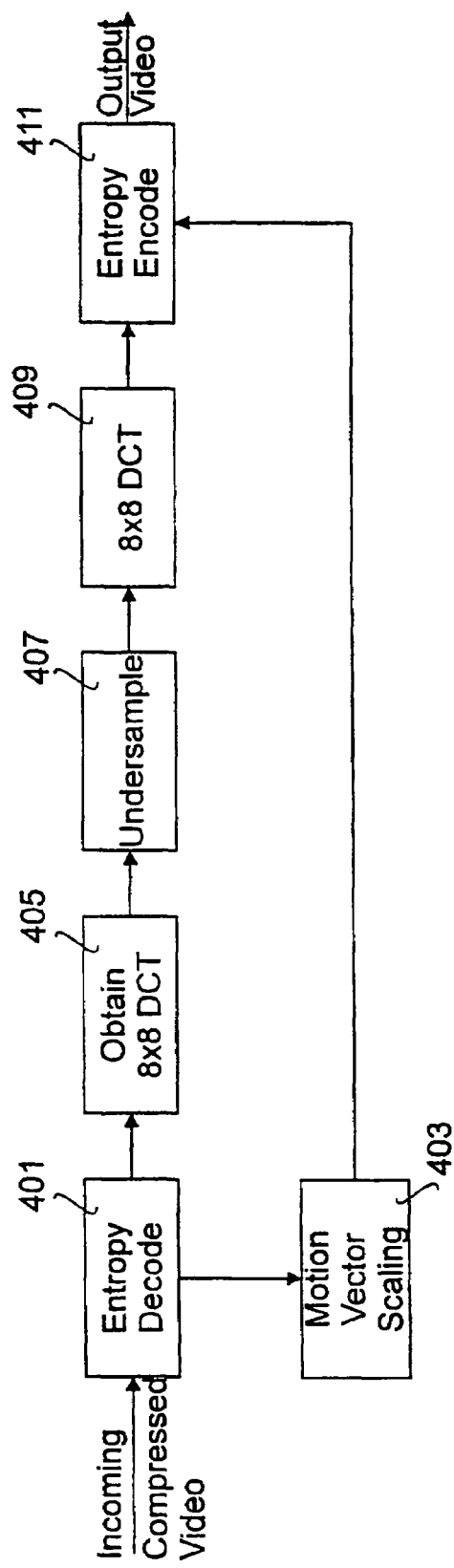
FIG. 4 is a general view of a video transcoder.

In FIG. 4 a general view of a video transcoder employing the teachings of the method described above, is shown. The transcoder receives an incoming bitstream of a compressed video signal. The received compressed video signal is decoded in block 401 wherein the motion vectors of the decompressed video signal are extracted. The motion vectors are fed to a block 403 in which a proper motion vector scaling in accordance with the transcoding performed by the transcoder is executed, as for example in this case a division by 2 is performed. The image information not related to the motion vectors are fed to a block 405 from block 401.

In block 405 DCT blocks of size 8×8 are obtained. The DCT blocks of size 8×8 are then fed to a block 407 in which four adjacent 8×8 DCT blocks are combined to one, undersampled, 8×8 DCT block according to the method described above. The new, undersampled, 8×8 DCT blocks are then available in a block 409. A block 411 then encodes the 8×8 DCT blocks in the block 409, which also can involve a re-quantization of the DCT coefficients, together with the scaled motion vectors from block 403 and forms a combined compressed output video signal.

Furthermore, in U.S. Pat. No. 5,107,345 and U.S. Pat. No. 5,452,104 an adaptive block size image compression method and system is proposed. For a block size of 16×16 pixels, the system calculates DCTs for the 16×16 blocks and the 8×8, 4×4 and 2×2 blocks that constitute the 16×16 block. The algorithm as described herein can be used to compute the N×N block by having the 4(N/2×N/2) DCT coefficients. For example, by having the DCT coefficients of each 2×2 block one can compute the DCT coefficients for the 4×4 blocks. By having the DCT coefficients for each 4×4 block one can compute the DCT coefficients for the 8×8 blocks, etc. The DCT algorithm can therefore be used for the efficient coding in the schemes described in U.S. Pat. No. 5,107,345 and U.S. Pat. No. 5,452,104.

The invention claimed is:

1. A method of transmitting a bit stream representing digitalized images to a user which requires a reduction of the bit stream, the method comprising:

encoding the digitalized images in a compressed discrete cosine transform (DCT) domain using DCTs of length N/2 to produce a first encoded bitstream of coefficients;

receiving in a transcoder the first encoded bit stream;

undersampling in the transcoder, by removing selected ones of the coefficients, the compressed digitalized images represented by the first encoded bitstream by a certain factor in each dimension; and calculating, from the remaining coefficients, DCTs of length N×N, each of the DCTs of length N×N calculated directly from four adjacent DCT coefficient blocks of size N/2×N/2 of the remaining coefficients, for each of the digitalized images, N being a positive, even integer to produce a second encoded bitstream; and transmitting from the transcoder the second encoded bit stream to the user.

2. A method of transmitting a bit stream representing digitalized images to a user, the method comprising:
  encoding the digitalized images in a compressed discrete cosine transform (DCT) domain using DCTs of length N/2 to produce a first encoded bitstream of coefficients;
  receiving in a transcoder the first encoded bit stream;
  recording in the transcoder the digitalized images represented by the coefficients in the first encoded bitstream to discrete cosine transform (DCT) transformed sequences of coefficients of length N, N being a positive, even integer, to produce a second encoded bitstream, the recoding comprising:
    calculating the coefficients of a DCT of length N directly from two sequences of DCT coefficients of length N/2,
  wherein the two sequences of coefficients are obtained from DCTs of length N/2 and correspond to the first half and second half, respectively, of an original sequence of data of the digitalized images; and
  transmitting from the transcoder the second encoded bit stream to the user.

3. A method according to claim 2, wherein the even coefficients of the DCT of length N are calculated as:

$$X_{2k} = \sqrt{\frac{2}{N}} \varepsilon_{2k} \sum_{n=0}^{N-1} x_n \cos \frac{(2n+1)2k\pi}{2N}$$

$$= \sqrt{\frac{2}{N}} \varepsilon_k \left\{ \sum_{n=0}^{\frac{N}{2}-1} x_n \cos \frac{(2n+1)k\pi}{2(N/2)} + \sum_{n=N/2}^{N-1} x_n \cos \frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos \frac{(2n+1)k\pi}{2(N/2)} + \sum_{n=0}^{\frac{N}{2}-1} x_{N-1-n} \cos \left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos \frac{(2n+1)k\pi}{2(N/2)} + \sqrt{\frac{2}{N/2}} \varepsilon_k \sum_{n=0}^{\frac{N}{2}-1} z_n \cos \frac{(2n+1)k\pi}{2(N/2)} \right\}$$

$$= \sqrt{\frac{1}{2}} [Y_k + (-1)^k Z_k]$$

$$= \sqrt{\frac{1}{2}} [Y_k + Z'_k]$$

$$k = 0, 1, \ldots, (N/2) - 1$$

and the odd coefficients $R_k = X_{2k+1}$ as $$R_k = R'_k - R_{k-1}$$

where $$R'_k = \sqrt{\frac{2}{N}} \left\{ \sum_{n=0}^{N-1} x_n \cos \frac{(2n+1)(2k+1)\pi}{2N} + \sum_{n=0}^{N-1} x_n \cos \frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2 \cos \frac{(2n+1)\pi}{2N} \cos \frac{(2n+1)k\pi}{2(N/2)} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} r_n \cos \frac{(2n+1)k\pi}{2(N/2)} \right\} \text{ or }$$

$$= \frac{1}{\varepsilon_k} \sqrt{\frac{1}{2}} \{ \text{length-} N/2 \ DCT\text{-}II \text{ of } r_n \}$$

where $$r_n = (y_n - z'_n) 2 \cos \frac{(2n+1)\pi}{2N}$$

$$= \left\{ \sqrt{\frac{2}{N/2}} \sum_{l=0}^{\frac{N}{2}-1} \varepsilon_l Y_l \cos \frac{(2n+1)l\pi}{2(N/2)} - \sqrt{\frac{2}{N/2}} \sum_{l=0}^{\frac{N}{2}-1} \varepsilon_l Z'_l \cos \frac{(2n+1)l\pi}{2(N/2)} \right\} 2 \cos \frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos \frac{(2n+1)l\pi}{2(N/2)} \right\} 2 \cos \frac{(2n+1)\pi}{2N}$$

$$= g_n 2 \cos \frac{(2n+1)\pi}{2N}$$

where
$g_n$ is a length-N/2 IDCT of $(Y_i - Z'_i)$, and where
$R'_k = X_{2k+1} + X_{2k-1}$, or as $$X_{2k+1} = \sqrt{\frac{2}{N}} \varepsilon_{2k+1} \sum_{i=0}^{N-1} x_i \cos \frac{(2i+1)(2k+1)\pi}{2N}$$

$$= \sqrt{\frac{2}{N}} \left\{ \sum_{i=0}^{\frac{N}{2}-1} x_i \cos \frac{(2i+1)(2k+1)\pi}{2N} + \sum_{i=0}^{\frac{N}{2}-1} x_{i+N/2} \cos \frac{(2i+N+1)(2k+1)\pi}{2N} \right\}$$

$$= \sqrt{\frac{2}{N}} \left\{ \sum_{i=0}^{\frac{N}{2}-1} y_i \cos \frac{(2i+1)(2k+1)\pi}{2N} + \sum_{i=0}^{\frac{N}{2}-1} z_i \cos \left[\frac{(2i+1)(2k+1)\pi}{2N} + \left(k\pi + \frac{\pi}{2}\right)\right] \right\}$$

$$= \sqrt{\frac{2}{N}} \left\{ \sum_{i=0}^{\frac{N}{2}-1} y_i \cos \frac{(2i+1)(2k+1)\pi}{2N} + (-1)^{k+1} \sum_{i=0}^{\frac{N}{2}-1} z_i \sin \frac{(2i+1)(2k+1)\pi}{2N} \right\}$$

-continued $$= \sqrt{\frac{2}{N}} (X1_k - (-1)^k X2_k), \quad k = 0, 1, \ldots, (N/2) - 1.$$

4. The method of claim 1, wherein N is equal to $2^m$, m being a positive integer.

5. A method of transmitting a bit stream representing a digitalized image as a compressed video signal which includes coefficients obtained by calculating DCTs for blocks of size N/2×N/2, the blocks being obtained by dividing the digitalized image, to a plurality of users, at least one of which requires a reduction of the bit stream or down-scaling of the corresponding compressed video signal, the method comprising:
  receiving in a transcoder the bit stream of the compressed video signal;
  extracting from the received bit stream the coefficients for the blocks of size N/2×N/2;
  collecting the extracted coefficients for four adjacent blocks of size N/2×N/2, the groups of four adjacent blocks forming together non-overlapping blocks of size N×N in the digitalized image;
  calculating, from the collected coefficients, coefficients of the DCTs for the blocks of size N×N using DCTs and IDCTs of length N/2 and without using DCTs or IDCTs of length N or using DCTs and IDCTs for blocks of the size N/2×N/2 and without using DCTs or IDCTs of length N×N,
  selecting, from the calculated coefficients, coefficients of the lowest frequencies; and
  transmitting to the at least one user a bit stream including only the selected coefficients.

6. A method of transmitting a bit stream representing a digitalized image as a compressed video signal, which includes coefficients obtained by calculating DCTs for blocks of size N×N, the blocks being obtained by dividing the digitalized image, to a plurality of users, at least one of which requires a reduction of the bit stream or down-scaling of the corresponding compressed video signal, the method comprising:
  receiving in a transcoder the bit stream of the compressed video signal;
  extracting, from the received bit stream, the coefficients for the blocks of size N×N;
  collecting the extracted coefficients for four adjacent blocks of size N×N, the groups of four adjacent blocks forming together non-overlapping blocks of size 2N×2N in the digitalized image;
  selecting, from the collected, extracted coefficients for each block of size N×N of each of the groups of four adjacent blocks of the size N×N, coefficients of N/2× N/2 lowest frequencies;
  calculating, from the selected coefficients for each of the groups, coefficients of the DCT for a block of size N×N using DCTs and IDCTs of length N/2 and without using DCTs or IDCTs of length N or using DCTs and IDCTs for blocks of size N/2×N/2 and without using DCTs or IDCTs of length N×N, and
  transmitting to the at least one user a bit stream including only the calculated coefficients.

7. The method of claim 6, wherein, in the step of calculating coefficients of DCTs for blocks of size N×N the even coefficients of a DCT of length N are calculated as:

$$X_{2k} = \sqrt{\frac{2}{N}} \varepsilon_{2k} \sum_{n=0}^{N-1} x_n \cos \frac{(2n+1)2k\pi}{2N}$$

$$= \sqrt{\frac{2}{N}} \varepsilon_k \left\{ \sum_{n=0}^{\frac{N}{2}-1} x_n \cos \frac{(2n+1)k\pi}{2(N/2)} + \sum_{n=N/2}^{N-1} x_n \cos \frac{(2n+1)k\pi}{(2N/2)} \right\}$$

$$= \sqrt{\frac{2}{N}} \varepsilon_k \left\{ \sum_{n=0}^{\frac{N}{2}-1} y_n \cos \frac{(2n+1)k\pi}{2(N/2)} + \sum_{n=0}^{\frac{N}{2}-1} x_{N-1-n} \cos \left[ \frac{[2(N-1-n)+1]k\pi}{2(N/2)} \right] \right\}$$

$$= \sqrt{\frac{1}{2}} \left\{ \sqrt{\frac{2}{N/2}} \varepsilon_k \sum_{n=0}^{\frac{N}{2}-1} y_n \cos \frac{(2n+1)k\pi}{(2N/2)} + \sqrt{\frac{2}{N/2}} \varepsilon_k \sum_{n=0}^{\frac{N}{2}-1} z_n \cos \frac{(2n+1)k\pi}{(2N/2)} \right\}$$

$$= \sqrt{\frac{1}{2}} [Y_k + (-1)^k Z_k]$$

$$= \sqrt{\frac{1}{2}} [Y_k + Z'_k] \quad k = 0, 1, \ldots, (N/2) - 1$$

and the odd coefficients $R_k = X_{2k+1}$ as $$R_k = R'_k - R_{k-1}$$

where $$R'_k = \sqrt{\frac{2}{N}} \left\{ \sum_{n=0}^{N-1} x_n \cos \frac{(2n+1)(2k+1)\pi}{2N} + \sum_{n=0}^{N-1} x_n \cos \frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2\cos \frac{(2n+1)\pi}{2N} \cos \frac{(2n+1)k\pi}{2(N/2)} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} r_n \cos \frac{(2n+1)k\pi}{2(N/2)} \right\} \text{ or }$$

$$= \frac{1}{\varepsilon_k} \sqrt{\frac{1}{2}} \{\text{length-}N/2 \text{ } DCT\text{-}II \text{ of } r_n\}$$

where $$r_n = (y_n - z'_n) 2 \cos \frac{(2n+1)\pi}{2N}$$

$$= \left\{ \sqrt{\frac{2}{N/2}} \sum_{l=0}^{\frac{N}{2}-1} \varepsilon_l Y_l \cos \frac{(2n+1)l\pi}{2(N/2)} - \sqrt{\frac{2}{N/2}} \sum_{l=0}^{\frac{N}{2}-1} \varepsilon_l Z'_l \cos \frac{(2n+1)l\pi}{2(N/2)} \right\} 2\cos \frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos \frac{(2n+1)l\pi}{2(N/2)} \right\} 2\cos \frac{(2n+1)\pi}{2N}$$

$$= g_n 2\cos \frac{(2n+1)\pi}{2N}$$

where $g_n$ is a length-N/2 IDCT of $(Y_i - Z'_i)$, and $R'_k = X_{2k+1} + X_{2k-1}$, or as $$X_{2k+1} = \sqrt{\frac{2}{N}} \varepsilon_{2k+1} \sum_{i=0}^{N-1} x_i \cos\frac{(2i+1)(2k+1)\pi}{2N}$$

$$= \sqrt{\frac{2}{N}} \left\{ \sum_{i=0}^{\frac{N}{2}-1} x_i \cos\frac{(2i+1)(2k+1)\pi}{2N} + \sum_{i=0}^{\frac{N}{2}-1} x_{i+N/2} \cos\frac{(2i+N+1)(2k+1)\pi}{2N} \right\}$$

$$= \sqrt{\frac{2}{N}} \left\{ \sum_{i=0}^{\frac{N}{2}-1} y_i \cos\frac{(2i+1)(2k+1)\pi}{2N} + \sum_{i=0}^{\frac{N}{2}-1} z_i \cos\left[\frac{(2i+1)(2k+1)\pi}{2N} + \left(k\pi + \frac{\pi}{2}\right)\right] \right\}$$

$$= \sqrt{\frac{2}{N}} \left\{ \sum_{i=0}^{\frac{N}{2}-1} y_i \cos\frac{(2i+1)(2k+1)\pi}{2N} + (-1)^{k+1} \sum_{i=0}^{\frac{N}{2}-1} z_i \sin\frac{(2i+1)(2k+1)\pi}{2N} \right\}$$

$$= \sqrt{\frac{2}{N}} (X1_k - (-1)^k X2_k), \quad k = 0, 1, \ldots, (N/2) - 1.$$

8. A transmission system for transmitting digitalized images where users are connected to each other through a multi-node control unit and bit streams of digitalized images corresponding to compressed video signals are transmitted between the users, the compressed video signal including coefficients obtained by calculating discrete cosine transforms (DCTs) for blocks of size N/2×N/2 obtained by dividing the digitalized image, a first one of the users, for receiving a bit stream transmitted from a second one of the users, requiring a reduction of the bit stream or down-scaling of the corresponding compressed video signal, the multi-node control unit comprising:

means for receiving said bit stream from the second one of the users and for extracting from the bit stream coefficients for blocks of size N/2×N/2 in a corresponding digitalized image;

means for collecting the extracted coefficients for four adjacent blocks of size N/2×N/2;

means for calculating from the collected coefficients coefficients for a DCT for a block of size N×N using DCTs and IDCTs of length N/2 and without using DCTs or IDCTs of length N or using DCTs and IDCTs for blocks of the size N/2×N/2 and without using DCTs or IDCTs of length N×N;

means for selecting, from the calculated coefficients, coefficients for the lowest frequencies, and means for transmitting to the first one of the users a bit stream including only the selected coefficients.

9. A transmission system for transmitting digitalized images, the system including users connected to each other through a multi-node control unit, bit streams of digitalized images being compressed video signals transmitted between the users, the compressed video signal for a digitalized image comprising coefficients obtained by calculating DCTs for blocks of size N×N obtained by dividing the digitalized image, a first one of the users, for receiving a bit stream transmitted from a second one of the users, requiring a reduction of the bit stream or down-scaling of the corresponding compressed video signal, the multi-node control unit comprising:

means for receiving said bit stream from the second one of the users and for extracting from the bit stream coefficients for blocks of size N×N in a corresponding digitalized image;

means for collecting the extracted coefficients for four adjacent blocks of size N×N;

means for selecting, from the extracted coefficients for each of the four adjacent blocks, coefficients for N/2×N/2 lowest frequencies;

means for calculating, from the selected coefficients, coefficients for a DCT for a block of size N×N using DCTs and IDCTs of length N/2 and without using DCTs or IDCTs of length N or using DCTs and IDCTs for blocks of size N/2×N/2 and without using DCTs or IDCTs of length N×N; and means for transmitting to the first one of the users a bit stream including only the calculated coefficients.

10. The method of claim 5, wherein, in the step of calculating coefficients of DCTs for blocks of size N×N the even coefficients of a DCT of length N are calculated as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z_k]$$

$$= \sqrt{\frac{1}{2}} [Y_k + Z'_k] \quad k = 0, 1, \ldots, (N/2) - 1$$

and the odd coefficients $R_k = X_{2k+1}$ as $R_k = R'_k - R_{k-1}$ where $$R'_k = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2\cos\frac{(2n+1)\pi}{2N} \cos\frac{(2n+1)k\pi}{2(N/2)} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} \text{ or }$$

$$= \frac{1}{\varepsilon_k} \sqrt{\frac{1}{2}} \{\text{length-}N/2 \; DCT\text{-}II \text{ of } r_n\}$$

where $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l Y_l \cos\frac{(2n+1)l\pi}{2(N/2)} - \sqrt{\frac{2}{N/2}} \sum_{l=0}^{\frac{N}{2}-1} \varepsilon_l Z'_l \cos\frac{(2n+1)l\pi}{2(N/2)} \right\} 2\cos\frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos\frac{(2n+1)l\pi}{2(N/2)} \right\} 2\cos\frac{(2n+1)\pi}{2N}$$

$$= g_n 2\cos\frac{(2n+1)\pi}{2N}$$

where $g_n$ is a length-$N/2$ IDCT of $(Y_i - Z'_i)$, and $R'_k = X_{2k+1} + X_{2k-1}$, or as $$X_{2k+1} = \sqrt{\frac{2}{N}} \varepsilon_{2k+1} \sum_{i=0}^{N-1} x_i \cos\frac{(2i+1)(2k+1)\pi}{2N}$$

$$= \sqrt{\frac{2}{N}} \left\{ \sum_{i=0}^{\frac{N}{2}-1} x_i \cos\frac{(2i+1)(2k+1)\pi}{2N} + \sum_{i=0}^{\frac{N}{2}-1} x_{i+N/2} \cos\frac{(2i+N+1)(2k+1)\pi}{2N} \right\}$$

$$= \sqrt{\frac{2}{N}} \left\{ \sum_{i=0}^{\frac{N}{2}-1} y_i \cos\frac{(2i+1)(2k+1)\pi}{2N} + \sum_{i=0}^{\frac{N}{2}-1} z_i \cos\left[\frac{(2i+1)(2k+1)\pi}{2N} + \left(k\pi + \frac{\pi}{2}\right)\right] \right\}$$

$$= \sqrt{\frac{2}{N}} \left\{ \sum_{i=0}^{\frac{N}{2}-1} y_i \cos\frac{(2i+1)(2k+1)\pi}{2N} + (-1)^{k+1} \sum_{i=0}^{\frac{N}{2}-1} z_i \sin\frac{(2i+1)(2k+1)\pi}{2N} \right\}$$

-continued $$= \sqrt{\frac{2}{N}} (X1_k - (-1)^k X2_k), \quad k = 0, 1, \ldots, (N/2) - 1.$$

11. The transmission system of claim 8, wherein the means for calculating calculates the even coefficients of the DCT of length N as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z_k]$$

$$= \sqrt{\frac{1}{2}} [Y_k + Z'_k] \quad k = 0, 1, \ldots, (N/2) - 1$$

and the odd coefficients $R_k = X_{2k+1}$ as $R_k = R'_k - R_{k-1}$ where $$R'_k = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2\cos\frac{(2n+1)\pi}{2N} \cos\frac{(2n+1)k\pi}{2(N/2)} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} \text{ or }$$

$$= \frac{1}{\varepsilon_k} \sqrt{\frac{1}{2}} \{\text{length-}N/2 \; DCT\text{-}II \text{ of } r_n\}$$

-continued where $$r_n = (y_n - z'_n)2\cos\frac{(2n+1)\pi}{2N}$$

$$= \left\{\sqrt{\frac{2}{N/2}} \sum_{l=0}^{\frac{N}{2}-1} \varepsilon_l Y_l \cos\frac{(2n+1)l\pi}{2(N/2)} - \sqrt{\frac{2}{N/2}} \sum_{l=0}^{\frac{N}{2}-1} \varepsilon_l Z'_l \cos\frac{(2n+1)l\pi}{2(N/2)}\right\} 2\cos\frac{(2n+1)\pi}{2N}$$

$$= \left\{\sqrt{\frac{2}{N/2}} \sum_{l=0}^{\frac{N}{2}-1} \varepsilon_l (Y_l - Z'_l)\cos\frac{(2n+1)l\pi}{2(N/2)}\right\} 2\cos\frac{(2n+1)\pi}{2N}$$

$$= g_n 2\cos\frac{(2n+1)\pi}{2N}$$

where $g_n$ is a length-N/2 IDCT of $(Y_i - Z'_i)$, and where $R'_k = X_{2k+1} + X_{2k-1}$, or as $$X_{2k+1} = \sqrt{\frac{2}{N}} \varepsilon_{2k+1} \sum_{i=0}^{N-1} x_i \cos\frac{(2i+1)(2k+1)\pi}{2N}$$

$$= \sqrt{\frac{2}{N}} \left\{\sum_{i=0}^{\frac{N}{2}-1} x_i \cos\frac{(2i+1)(2k+1)\pi}{2N} + \sum_{i=0}^{\frac{N}{2}-1} x_{i+N/2} \cos\frac{(2i+N+1)(2k+1)\pi}{2N}\right\}$$

$$= \sqrt{\frac{2}{N}} \left\{\sum_{i=0}^{\frac{N}{2}-1} y_i \cos\frac{(2i+1)(2k+1)\pi}{2N} + \sum_{i=0}^{\frac{N}{2}-1} z_i \cos\left[\frac{(2i+1)(2k+1)\pi}{2N} + \left(k\pi + \frac{\pi}{2}\right)\right]\right\}$$

$$= \sqrt{\frac{2}{N}} \left\{\sum_{i=0}^{\frac{N}{2}-1} y_i \cos\frac{(2i+1)(2k+1)\pi}{2N} + (-1)^{k+1} \sum_{i=0}^{\frac{N}{2}-1} z_i \sin\frac{(2i+1)(2k+1)\pi}{2N}\right\}$$

$$= \sqrt{\frac{2}{N}} (X1_k - (-1)^k X2_k), \quad k = 0, 1, \ldots, (N/2) - 1.$$

12. The transmission system of claim 9, wherein the means for calculating calculates the even coefficients of the DCT of length N as:

$$X_{2k} = \sqrt{\frac{1}{2}} [Y_k + (-1)^k Z_k] \quad k = 0, 1, \ldots, (N/2) - 1.$$

$$Y_k = \sqrt{\frac{2}{N/2}} \varepsilon_k \sum_{n=0}^{\frac{N}{2}-1} y_n \cos\frac{(2n+1)k\pi}{2(N/2)} \quad k = 0, 1, \ldots, (N/2) - 1.$$

$$Z_k = \sqrt{\frac{2}{N/2}} \varepsilon_k \sum_{n=0}^{\frac{N}{2}-1} z_n \cos\frac{(2n+1)k\pi}{2(N/2)} \quad k = 0, 1, \ldots, (N/2) - 1$$

and the odd coefficients $R_k = X_{2k+1}$ as $R_k = R'_k - R_{k-1}$ where $$R'_k = \sqrt{\frac{2}{N}} \left\{\sum_{n=0}^{N-1} x_n \cos\frac{(2n+1)(2k+1)\pi}{2N} + \sum_{n=0}^{N-1} x_n \cos\frac{(2n+1)(2k-1)\pi}{2N}\right\}$$

$$= \frac{1}{\varepsilon_k}\sqrt{\frac{1}{2}} \left\{\sqrt{\frac{2}{N/2}} \varepsilon_k \sum_{n=0}^{\frac{N}{2}-1} (y_n - z'_n)2\cos\frac{(2n+1)\pi}{2N}\cos\frac{(2n+1)k\pi}{2(N/2)}\right\}$$

$$= \frac{1}{\varepsilon_k}\sqrt{\frac{1}{2}} \left\{\sqrt{\frac{2}{N/2}} \varepsilon_k \sum_{n=0}^{\frac{N}{2}-1} r_n \cos\frac{(2n+1)k\pi}{2(N/2)}\right\} \text{ or }$$

$$= \frac{1}{\varepsilon_k}\sqrt{\frac{1}{2}} \{\text{length-}N/2 \text{ } DCT\text{-}II \text{ of } r_n\}$$

where $$r_n = (y_n - z'_n)2\cos\frac{(2n+1)\pi}{2N}$$

$$= \left\{\sqrt{\frac{2}{N/2}} \sum_{l=0}^{\frac{N}{2}-1} \varepsilon_l Y_l \cos\frac{(2n+1)l\pi}{2(N/2)} - \sqrt{\frac{2}{N/2}} \sum_{l=0}^{\frac{N}{2}-1} \varepsilon_l Z'_l \cos\frac{(2n+1)l\pi}{2(N/2)}\right\} 2\cos\frac{(2n+1)\pi}{2N}$$

$$= \left\{\sqrt{\frac{2}{N/2}} \sum_{l=0}^{\frac{N}{2}-1} \varepsilon_l (Y_l - Z'_l)\cos\frac{(2n+1)l\pi}{2(N/2)}\right\} 2\cos\frac{(2n+1)\pi}{2N}$$

$$= g_n 2\cos\frac{(2n+1)\pi}{2N}$$

where $g_n$ is a length-N/2 IDCT of $(Y_i - Z'_i)$ and where $R'_k = X_{2k+1} + X_{2k-1}$, or as $$X_{2k+1} = \sqrt{\frac{2}{N}} \varepsilon_{2k+1} \sum_{i=0}^{N-1} x_i \cos \frac{(2i+1)(2\kappa+1)\pi}{2N}$$

$$= \sqrt{\frac{2}{N}} \left\{ \sum_{i=0}^{\frac{N}{2}-1} x_i \cos \frac{(2i+1)(2k+1)\pi}{2N} + \sum_{i=0}^{\frac{N}{2}-1} x_{i+N/2} \cos \frac{(2i+N+1)(2k+1)\pi}{2N} \right\}$$

$$= \sqrt{\frac{2}{N}} \left\{ \sum_{i=0}^{\frac{N}{2}-1} y_i \cos \frac{(2i+1)(2k+1)\pi}{2N} + \right.$$

-continued $$\left. \sum_{i=0}^{\frac{N}{2}-1} z_i \cos \left[ \frac{(2i+1)(2k+1)\pi}{2N} + \left(k\pi + \frac{\pi}{2}\right) \right] \right\}$$

$$= \sqrt{\frac{2}{N}} \left\{ \sum_{i=0}^{\frac{N}{2}-1} y_i \cos \frac{(2i+1)(2k+1)\pi}{2N} + (-1)^{k+1} \sum_{i=0}^{\frac{N}{2}-1} z_i \sin \frac{(2i+1)(2k+1)\pi}{2N} \right\}$$

$$= \sqrt{\frac{2}{N}} (X1_k - (-1)^k X2_k), \quad k = 0, 1, \ldots, (N/2)-1.$$

\* \* \* \* \*